United States Patent
Murakami

(10) Patent No.: US 7,657,532 B2
(45) Date of Patent: Feb. 2, 2010

(54) PASSWORD MANAGEMENT DEVICE, PASSWORD MANAGEMENT METHOD, AND PASSWORD MANAGEMENT PROGRAM

(75) Inventor: Atsushi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 232 days.

(21) Appl. No.: 11/442,236

(22) Filed: May 30, 2006

(65) Prior Publication Data

US 2007/0220270 A1    Sep. 20, 2007

(30) Foreign Application Priority Data

Feb. 23, 2006    (JP)    .............................. 2006-046494

(51) Int. Cl.
*G06F 17/30*    (2006.01)
(52) U.S. Cl. .............................. 707/9; 707/10; 726/18; 340/10.1; 340/572.1; 705/28
(58) Field of Classification Search .................. 726/18; 707/9, 10; 705/28; 340/10.1, 572.1
See application file for complete search history.

(56) References Cited

U.S. PATENT DOCUMENTS

| | | | | | |
|---|---|---|---|---|---|
| 4,992,783 | A | * | 2/1991 | Zdunek et al. | 340/5.74 |
| 5,646,604 | A | * | 7/1997 | Maruyama et al. | 340/5.22 |
| 5,963,142 | A | * | 10/1999 | Zinsky et al. | 340/5.74 |
| 6,006,333 | A | * | 12/1999 | Nielsen | 726/8 |
| 6,826,700 | B1 | * | 11/2004 | Germscheid et al. | 726/5 |
| 7,240,037 | B1 | * | 7/2007 | Bussell | 705/75 |
| 2002/0198795 | A1 | * | 12/2002 | Dorenbosch | 705/28 |
| 2004/0230800 | A1 | * | 11/2004 | Futa et al. | 713/169 |
| 2005/0193199 | A1 | * | 9/2005 | Asokan et al. | 713/168 |
| 2006/0085635 | A1 | * | 4/2006 | Park | 713/159 |
| 2006/0107316 | A1 | * | 5/2006 | Fiske | 726/18 |
| 2006/0271789 | A1 | * | 11/2006 | Satomura et al. | 713/183 |
| 2007/0103274 | A1 | * | 5/2007 | Berthold | 340/10.51 |

FOREIGN PATENT DOCUMENTS

| | | |
|---|---|---|
| CN | 1719451 A | 1/2006 |
| JP | 2000-194657 | 7/2000 |
| JP | 2001-308850 | 11/2001 |

OTHER PUBLICATIONS

Office Action issued May 23, 2008 in Chinese Application No. 200610087998.9.

* cited by examiner

*Primary Examiner*—Hosain T Alam
*Assistant Examiner*—Syling Yen
(74) *Attorney, Agent, or Firm*—Westerman, Hattori, Daniels & Adrian, LLP

(57) ABSTRACT

There is provided a password management device, password management method, and password management program to carry out secure logon. The management device includes: a first password storage region; a second password storage region; a password state information storage region that stores each of states of passwords as password state information; a wireless communication section that performs reading from the first password storage region and the second password storage region and performs reading from and writing into the password state information storage region, in accordance with an instruction from a PC via wireless communication with a reader/writer; and a contactless IC card control section that generates a new password if a change of a password registered in the PC to a new password is determined to be necessary, and writes the new password into a storage region different from another storage region of the registered password.

20 Claims, 3 Drawing Sheets

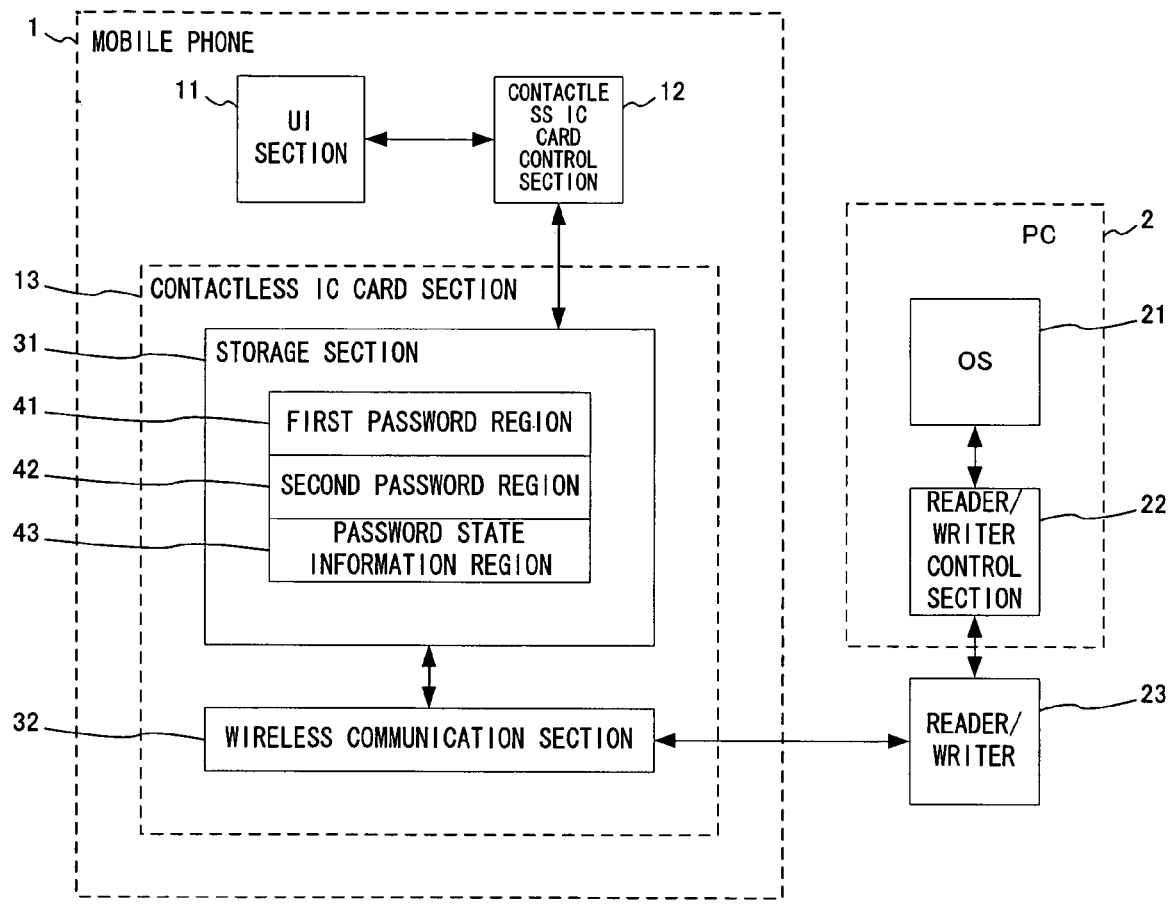

| PASSWORD STATE INFORMATION | | NOTES |
|---|---|---|
| FIRST PASSWORD STATE INFORMATION | SECOND PASSWORD STATE INFORMATION | |
| 0 | 0 | UNREGISTERED |
| X | 1 | 1ST PASSWORD IS BEING GENERATED |
| 1 | X | 2ND PASSWORD IS BEING GENERATE |
| X | 5 | 1ST PASSWORD IS BEING REGISTERED AS THE OS PASSWORD |
| 5 | X | 2ND PASSWORD IS BEING REGISTERED AS THE OS PASSWORD |
| X | 9 | 1ST PASSWORD HAS BEEN REGISTERED AS THE OS PASSWORD |
| 9 | X | 2ND PASSWORD HAS BEEN REGISTERED AS THE OS PASSWORD |

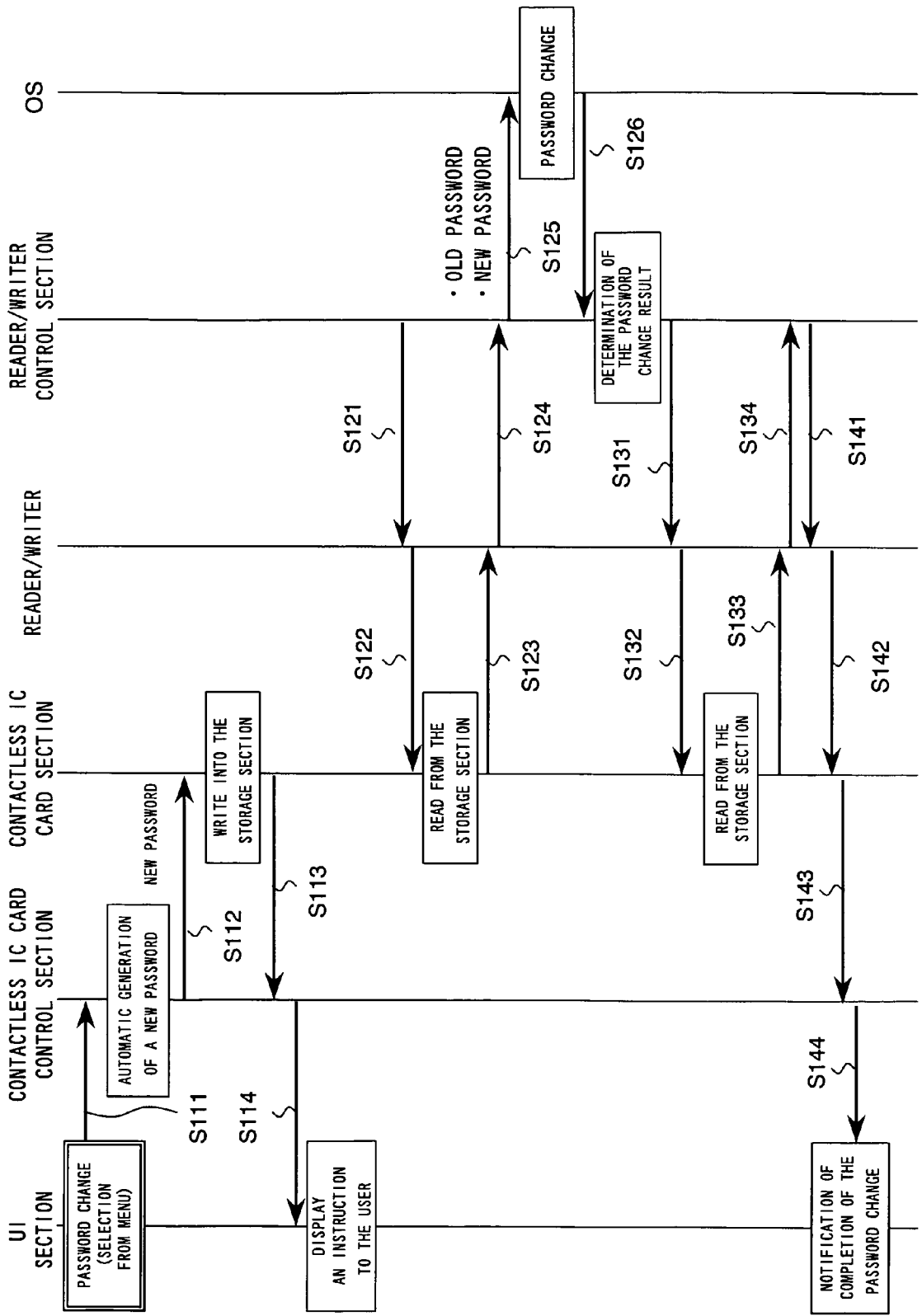

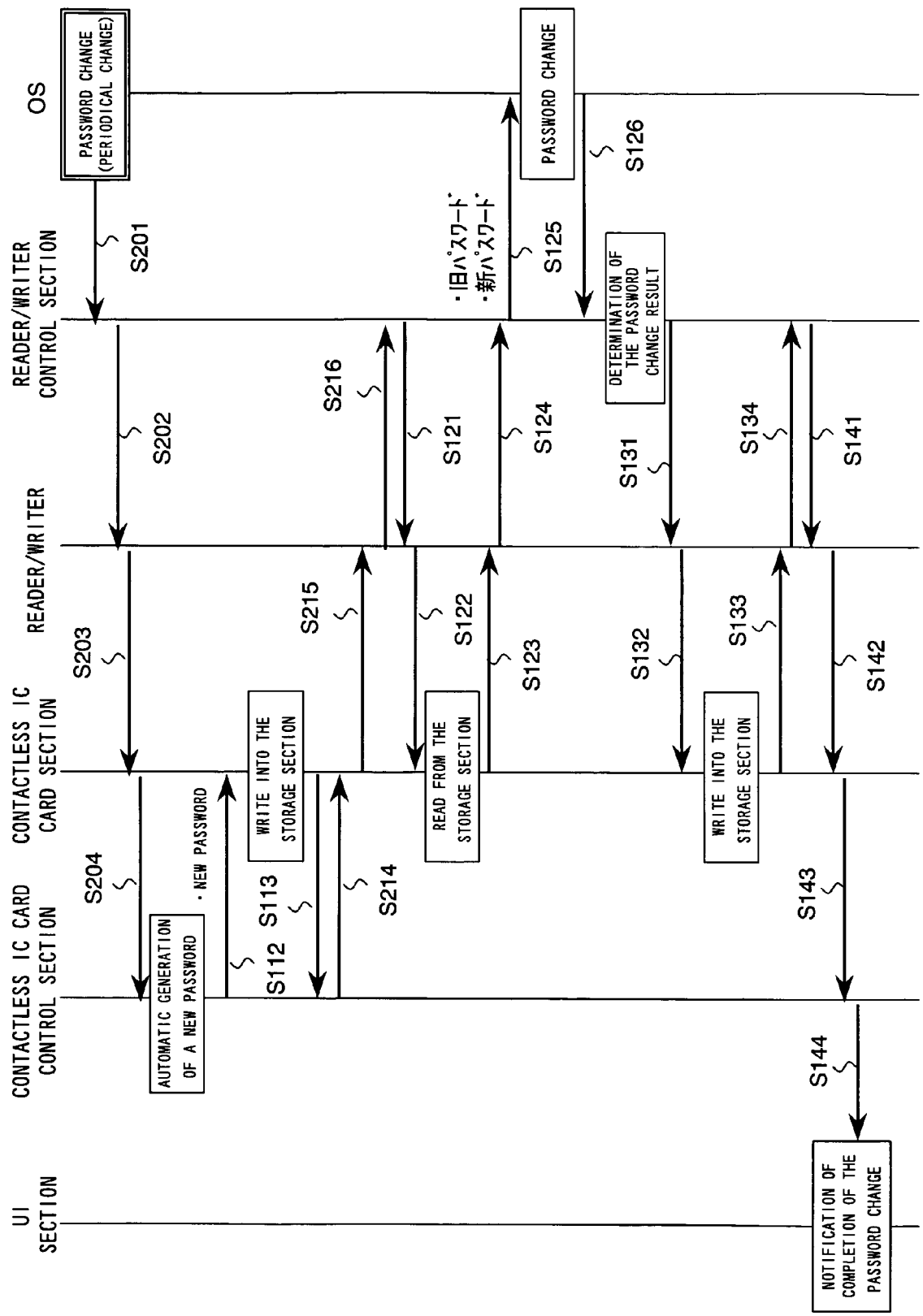

PASSWORD MANAGEMENT DEVICE, PASSWORD MANAGEMENT METHOD, AND PASSWORD MANAGEMENT PROGRAM

BACKGROUND OF THE INVENTION

1. Field of the Invention

The present invention relates to a password management device which manages a password read by an information processing device having a reader/writer, a password management method, and a password management program.

2. Description of the Related Art

A log-on system to log on a PC (Personal Computer) or an application by use of a contactless IC (Integrated Circuit) card has been put to practical use. Similarly, this kind of log-on system can be utilized by use of a mobile phone having a contactless IC card.

The log-on system using a contactless IC card has a function to generate automatically a random value, thereby to issue a password for user authentication, and to change an old password to a new password. To realize this function, a password stored in the contactless IC card has to be readable/writable by software on a PC.

As prior art relevant to the present invention, there has been a technique that a mobile phone transmits a pre-stored password at the start of communication and stores a new password at the end of communication (for example, see Jpn. Pat. Appln. Laid-Open Publication No. 2001-308850.

However, when attributes of respective items in a contactless IC card chip are written in a mobile phone having a built-in contactless IC card, writing lockable with a key needs to be carried out by a PC to ensure security. Unlike a general reader/writer, a reader/writer to realize this kind of writing requires a special reader/writer having the function to perform writing lockable with a key. Such a special reader/writer is used to issue a contactless IC card and therefore very expensive.

SUMMARY OF THE INVENTION

The present invention has been made to solve the problems described above, and has an object of providing a password management device, password management method, and password management program to achieve secure logon.

To achieve the above object, according to the present invention, there is provided a password management device that manages passwords read from an information processing device having a reader/writer, comprising: a password storage section that is capable of storing plural passwords; a password state information storage section that stores each of states of the passwords in the password storage section, as password state information; a wireless communication section that performs reading from the password storage section and performs reading and writing from and into the password state information storage section, in accordance with an instruction from the information processing device via wireless communication with the reader/writer; and a control section that determines whether a password registered in the information processing device needs to be changed to a new password or not, based on the password state information stored in the password state information storage section, generates a new password if necessary, and writes the new password into a storage region different from another storage region of the registered password in the password storage section.

Preferably in the password management device according to the present invention, if the new password is registered in the information processing device, password state information indicative of the new password having been registered is then written into the password state information storage section through the wireless communication section by the information processing device.

Preferably in the password management device according to the present invention, if the new password is being registered in the information processing device, the control section writes password state information indicative of the new password being registered, into the password state information storage section.

Preferably in the password management device according to the present invention, if the new password is being generated, the control section writes password state information indicative of the new password being generated, into the password state information storage section.

Preferably in the password management device according to the present invention, if the new password is generated, the control section then displays an indication that instructs a user to bring the wireless communication section over the reader/writer of the information processing device.

Preferably in the password management device according to the present invention, if an instruction about generation of a new password is given by a user's manipulation, the control section generates a new password.

Preferably in the password management device according to the present invention, if an instruction about generation of a new password is given from the information processing device through the wireless communication section, the control section generates a new password.

Also according to the present invention, there is provided a password management method that manages passwords read from a password management device having a wireless communication tag into an information processing device having a reader/writer, comprising: a password generation step in the password management device that determines whether a password registered in the information processing device among stored passwords needs to be changed to a new password or not, based on password state information indicative of a state of the password, and generates a new password if necessary; and a password writing step in the password management device that writes the new password into a storage region different from another storage region of the registered password.

Preferably in the password management method according to the present invention, if the new password is registered in the information processing device after the password writing step, a password state information writing step that writes password state information indicative of the new password having been registered via wireless communication into the password management device by the reader/writer is then executed, in the information processing device.

Preferably in the password management method according to the present invention, if the new password is being registered in the information processing device, the password writing step writes password state information indicative of the new password being registered, in the password management device.

Preferably in the password management method according to the present invention, if the new password is being created, the password generation step writes password state information indicative of the new password being generated, in the password management device.

Preferably in the password management method according to the present invention, if the new password is generated, the password generation step then displays an indication that instructs a user to put the password management device over the reader/writer of the information processing device.

Preferably in the password management method according to the present invention, if an instruction about generation of a new password is given by a user's manipulation, the password generation step generates a new password.

Preferably in the password management method according to the present invention, if an instruction about generation of a new password is given from the information processing device, the password generation step generates a new password.

Further according to the present invention, there is provided a password management program that makes a computer of a password management device manage passwords read from the password management device having a wireless communication tag into an information processing device having a reader/writer, comprising: a password generation step that determines whether a password registered in the information processing device among stored passwords needs to be changed to a new password or not, based on password state information indicative of a state of the password, and generates a new password if necessary; and a password writing step that writes the new password into a storage region different from another storage region of the registered password.

According to the present invention, the password management device generates a password and registers the password in the information processing device. Therefore, secure password management can be achieved.

BRIEF DESCRIPTION OF THE DRAWINGS

FIG. 1 is a block diagram showing an example of configuration of a logon system according to a first embodiment;

FIG. 2 is a table showing an example of configuration of password state information according to the first embodiment;

FIG. 3 is a sequence chart showing an example of operation of the logon system according to the first embodiment; and FIG. 4 is a sequence chart showing an example of operation of a logon system according to a second embodiment.

DETAILED DESCRIPTION OF THE PREFERRED EMBODIMENTS

Embodiments of the present invention will now be described with reference to the drawings.

First Embodiment

In this embodiment, a logon system which the user uses to log on an OS (Operation System) of an information processing device will be described as an example of a logon system. Further, a contactless IC card will be described as an example of a wireless communication tag. A mobile phone will be described as an example of a password management device having a wireless communication tag. A PC will be described as an example of the information processing device. In the logon system according to the present embodiment, a mobile phone is a factor which triggers a password change and also generates a password.

Configuration of the logon system according to the present embodiment will be described first.

FIG. 1 is a block diagram showing an example of configuration of the logon system according to the present embodiment. This logon system includes a mobile phone 1, a PC 2, and a reader/writer 23. The mobile phone 1 includes a UI (User Interface) section 11, a contactless IC card control section 12, and a contactless IC card section 13. The PC 2 includes an OS 21 and a reader/writer control section 22. The contactless IC card section 13 includes a storage section 31, and a wireless communication section 32. The storage section 31 includes a first password region 42 to store a first password, a second password region 41 to store a second password, and a password state information region 43 to store password state information. In this logon system, for example, the UI section 11, contactless IC card control section 12, OS 21, and reader/writer control section 22 are constituted in the form of software. The contactless IC card section 13 and the reader/writer 23 are constituted in the form of hardware.

Like wireless communication between a contactless IC card and a reader/writer, the user puts the mobile phone 1 over the reader/writer 23. A wireless signal transmitted from the reader/writer 23 reaches the wireless communication section 32. Then, wireless communication is made between the reader/writer 23 and the wireless communication section 32. By this wireless communication, the reader/writer control section 22 can perform reading/writing from/into the storage section 31 via the reader/writer 23 and the wireless communication section 32. The contactless IC card control section 12 can perform reading/writing directly from/into the storage section 31.

Next, password state information stored in the password state information region 43 will now be described.

FIG. 2 is a table showing an example of configuration of password state information according to the present embodiment. The password state information is expressed, for example, in an "XY" format. X is first password state information indicative of the state of the first password region 41. Y is second password state information indicative of the state of the second password region 42. Among values of X and Y, for example, "0" indicates that the password of a corresponding region is unregistered. "1" indicates that the password of a corresponding region is being generated. "5" indicates that the password of a corresponding region is being registered (changed) as an OS password. "9" indicates that the password of a corresponding region has been registered (changed) completely in both the contactless IC card section 13 and the OS 21 and is being used.

Next, operation of the logon system according to the present embodiment will be described.

FIG. 3 is a sequence chart showing an example of operation of the logon system according to the present embodiment. Firstly, the UI section 11 displays a menu in accordance with a user's manipulation. If a password change instruction is selected from the menu by a user's manipulation, the UI section 11 sends the password change instruction to the contactless IC card control section 12 (S111). The contactless IC card control section 12 which has received the password change instruction refers to the password state information region 43 in the storage section 31, and selects unused one of the first password region 41 and the second password region 42.

Described now will be a case that a currently used password (i.e., old password) is stored in the first password region 41 and a new password is written into the second password region 42. Now, the contactless IC card control section 12 sets "1" as the value of the second password state information Y. "1" indicates that the new password is being generated. Further, the contactless IC card control section 12 generates the new password and sends to the contactless IC card section 13 an instruction to write the new password into the selected password region (S112). In this case, the contactless IC card control section 12 generates a random value and takes the random value as the new password.

The contactless IC card section 13 which has received the write instruction writes the new password into the second password region 42 in accordance with the instruction. The contactless IC card section 13 also writes the password state information into the password state information region 43, and replies to the contactless IC card control section 12 by notifying that writing has been completed (S113). At this time, the contactless IC card control section 12 sets "5" as the value of the second password state information Y. "5" indicates that the password of the OS is being changed.

The contactless IC card control section 12 which has received the reply sends to the UI section 11 an instruction to display an indication inviting the user to put the mobile phone 1 over the reader/writer 23. The UI section 11 displays the indication in accordance with the instruction (S114).

Next, if the mobile phone 1 has been put over the reader/writer 23 by the user when a read instruction is given to the reader/writer 23 from the reader/writer control section 22 (S121), the reader/writer 23 accesses the storage section 31 of the contactless IC card section 13 (S122), and reads the contents of the first password region 41, second password region 42, and password state information region 43 (S123). The reader/writer 23 sends the read contents to the reader/writer control section 22 (S124). The reader/writer control section 22 which has received the contents of the storage section 31 uses the contents to change the password of the OS 21 (S125). Based on the content of the password state information region 43, the reader/writer control section 22 determines which of the first password region 41 and the second password region 42 are for the old password and the new password. The reader/writer control section 22 requests a password change of the OS 21, and sends the old and new passwords necessary for the password change.

Next, the OS 21 replies to the reader/writer control section 22 by a result of the password change (S126). The reader/writer control section 22 which has received the result of the password change determines whether the password change was successful or not. If successful, the reader/writer control section 22 issues an instruction to update the password state information to the reader/writer 23 (S131). The reader/writer 23 which has received the instruction to write password change information updates the password state information in the password state information region 43 of the contactless IC card section 13 (S132).

At this time, the contactless IC card control section 12 sets "9" as the value of the second password state information Y. "9" indicates that the change has already been done.

Next, the contactless IC card section 13 replies to the reader/writer 23 by notifying the completion of the writing (S133). The reader/writer 23 replies to the reader/writer control section 22 by answering the write instruction (S134). The reader/writer control section 22 which has received the reply sends a password change completion notification indicative of completion of the password change to the reader/writer 23 (S141). The reader/writer 23 further sends the notification to the contactless IC card section 13 (S142). The contactless IC card section 13 further sends the notification to the contactless IC card control section 12 (S143). The contactless IC card control section 12 which has received the password change completion notification issues to the UI section 11 an instruction to display an indication showing that the password change has been completed. The UI section 11 displays the indication in accordance with the instruction (S144), and then, this sequence ends.

In the present embodiment, two passwords are stored in the storage section 31. However, three or more passwords may be stored.

According to the present embodiment, a secure password change can be carried out easily at any time depending on a determination of the user of the mobile phone 1, without using a special reader/writer.

Second Embodiment

In the logon system according to this second embodiment, a PC is the factor which triggers a password change, and a mobile phone generates a password. Configuration of the logon system and configuration of password state information according to the present embodiment are the same as those of the first embodiment.

Operation of the logon system according to the present embodiment will be described next.

FIG. 4 is a sequence chart showing an example of operation of the logon system according to the present embodiment. In FIG. 4, the same reference symbols as those in FIG. 3 denote the same or equivalent processings as those in FIG. 3. Descriptions thereof will be omitted herefrom. In FIG. 4 compared with FIG. 3, processings S201, S202, S203, and S204 are executed in place of the processing S111 as well as processings S214, S215, and S216 in place of the processing S114.

The present embodiment will be described with reference to a case that the OS 21 issues periodically an instruction to change the password. At first, the OS 21 issues an instruction to change the password to the reader/writer control section 22 when the mobile phone 1 is put over the reader/writer 23 after a predetermined password change time has come (S201). The instruction is sent to the contactless IC card control section 12 through the reader/writer 23 and the contactless IC card section 13. Thereafter, the same processings S112 and S113 as those in the first embodiment are performed. The contactless IC card control section 12 which has received a reply transmits an instruction to change the password registered in the OS 21, through the contactless IC card section 13 (S214) and the reader/writer 23 (S215) to the reader/writer control section 22 (S216). Thereafter, the same processings S121 to S144 as those in the first embodiment are carried out, and then, this sequence ends.

According to the present embodiment, a secure password change can be carried out easily at any time depending on a determination of the OS 21, without using a special reader/writer.

The second embodiment has been described with reference to a case that the OS 21 periodically carries out a password change. However, the OS 21 may be configured to carry out the password change as the user manipulates the OS 21 on the PC 2.

A password management device according to the above embodiments can be easily applied to a mobile information terminal, and can thereby improve more the performance of the mobile information terminal. The mobile information terminal may include, for example, a mobile phone, PDA (Personal Digital Assistant), IC card, mobile audio player, a mobile picture player, or the like. The OS and the reader/writer control section according to the above embodiments can be easily applied to an information processing device, and can thereby improve more the performance of the information processing device. The information processing device may include, for example, a PC, workstation, server, or the like.

Further, a program that makes a computer constituting a password management device execute the processing steps described above can be provided as a password management program. The program can be executed the by the computer constituting a password management device if the program is stored in a recording medium readable from computers. The recording medium readable from computers may include an internal storage device built in a computer such as a ROM or RAM, a portable recording medium such as a CD-ROM, flexible disk, DVD disk, magneto-optical disk, or IC card, a database to store a computer program, another computer and a database thereof.

The password storage section corresponds to the first and second password regions in the embodiments. The password state information storage section corresponds to the password state information region in the embodiments. The control section corresponds to the contactless IC card control section in the embodiments.

The password generation step and the password writing step correspond to the processing S112 in the embodiments. The password state information writing step corresponds to the processing S132 in the embodiment.

What is claimed is:

1. A password management device that manages passwords read from an information processing device having a reader/writer, comprising:
   at least a processor;
   a password storage section that is configured to store plural passwords;
   a password state information storage section that stores each of states of the passwords in the password storage section, as password state information, the password state information shows whether the corresponding password is registered in the information processing device;
   a wireless communication section that when the wireless communication section receives an instruction to write password state information from the information processing device via wireless communication with the reader/writer, writes password state information indicated by the instruction to write password state information, into the password state information storage section,
   when the wireless communication section receives an instruction to read password state information form the information processing device via wireless communication with the reader/writer, reads password state information from the password state information storage section and sends the password state information to the information processing device via wireless communication with the reader/writer, and
   when the wireless communication section receives an instruction to read a password from the information processing device via wireless communication with the reader/writer, reads a password from the password storage section and sends the password to the information processing device via wireless communication with the reader/writer; and
   a control section that determines whether a password registered in the information processing device needs to be changed to a new password or not, based on the password state information stored in the password state information storage section, generates a new password when the determination that the password registered in the information processing device needs to be changed to the new password is made and writes the new password into a storage region different from another storage region of the registered password in the password storage section.

2. The password management device according to claim 1, wherein if the new password is registered in the information processing device, password state information indicative of the new password having been registered is then written into the password state information storage section through the wireless communication section by the information processing device.

3. The password management device according to claim 1, wherein if the new password is being registered in the information processing device, the control section writes password state information indicative of the new password being registered, into the password state information storage section.

4. The password management device according to claim 1, wherein if the new password is being generated, the control section writes password state information indicative of the new password being generated, into the password state information storage section.

5. The password management device according to claim 1, wherein if the new password is generated, the control section then displays an indication that instructs a user to bring the wireless communication section over the reader/writer of the information processing device.

6. The password management device according to claim 1, wherein if an instruction about generation of a new password is given by a user's manipulation, the control section generates a new password.

7. The password management device according to claim 1, wherein if an instruction about generation of a new password is given from the information processing device through the wireless communication section, the control section generates a new password.

8. A password management method that manages passwords read from a password management device having a wireless communication tag into an information processing device having a reader/writer, comprising:
   storing a plurality of passwords in a password storage section of the password management device;
   storing each of states of the plurality of passwords in the password storage section, as password state information, the password state information shows whether the corresponding password is registered in the information processing device;
   determining whether a password registered in the information processing device among stored passwords needs to be changed to a new password or not, based on password state information indicative of a state of the password and whether the corresponding password is registered in the information processing device, and generating the new password when the determination that the password registered in the information processing device needs to be changed to the new password is made;
   writing the new password into a storage region different from another storage region of the registered password in the password storage section; and
   writing password state information indicated by an instruction to write password state information, into the password state information storage section,
   when the password management device receives a second instruction to read password state information from the information processing device via wireless communication with the reader/writer, reading password state information indicated by the second instruction to read password state information and sending the password state information to the information processing device via wireless communication with the reader/writer, and when the password management device receives a third instruction to read a password from the information processing device via wireless communication with the reader/writer, reading a password indicated by the third instruction to read a password and sending the password to the information processing device via wireless communication with the reader/writer.

9. The password management method according to claim 8, wherein if the new password is registered in the information processing device writing password state information indicative of the new password having been registered via wireless communication into the password management device by the reader/writer, in the information processing device.

10. The password management method according to claim 8, wherein if the new password is being registered in the information processing device, writing password state information indicative of the new password being registered, in the password management device.

11. The password management method according to claim 8, wherein if the new password is being created, writing password state information indicative of the new password being generated, in the password management device.

12. The password management method according to claim 8, wherein if the new password is generated, displaying an indication that instructs a user to put the password management device over the reader/writer of the information processing device.

13. The password management method according to claim 8, wherein if an instruction about generation of a new password is given by a user's manipulation, generating a new password.

14. The password management method according to claim 8, wherein if an instruction about generation of a new password is given from the information processing device, generating a new password.

15. A computer-readable storage medium encoded with a password management program causing a computer of a password management device manage passwords read from the password management device having a wireless communication tag into an information processing device having a reader/writer, comprising:
   storing a plurality of passwords in a password storage section of the password management device;
   storing each of states of the plurality of passwords in the password storage section, as password state information, the password state information shows whether the corresponding password is registered in the information processing device;
   determining whether a password registered in the information processing device among stored passwords needs to be changed to a new password or not, based on password state information indicative of a state of the password and whether the corresponding password is registered in the information processing device, and generating the new password when the determination that the password registered in the information processing device needs to be changed to the new password is made;
   writing the new password into a storage region different from another storage region of the registered password in the password storage section; and
   writing password state information indicated by an instruction to write password state information, into the password state information storage section,
   when the password management device receives a second instruction to read password state information from the information processing device via wireless communication with the reader/writer, reading password state information indicated by the second instruction to read password state information and sending the password state information to the information processing device via wireless communication with the reader/writer, and
   when the password management device receives a third instruction to read a password from the information processing device via wireless communication with the reader/writer, reading a password indicated by the third instruction to read a password and sending the password to the information processing device via wireless communication with the reader/writer.

16. The computer-readable medium encoded with a password management program according to claim 15, wherein if the new password is registered in the information processing device, writing password state information indicative of the new password having been registered into the password state information storage section by the information processing device via wireless communication.

17. The computer-readable medium encoded with a password management program according to claim 15, wherein if the new password is being registered in the information processing device, writing password state information indicative of the new password being registered, in the password management device.

18. The computer-readable medium encoded with a password management program according to claim 15, wherein if the new password is being created, writing password state information indicative of the password being generated.

19. The computer-readable medium encoded with a password management program according to claim 15, wherein if the new password is generated, displaying an indication that instructs a user to put the password management device over the reader/writer of the information processing device.

20. The computer-readable medium encoded with a password management program according to claim 15, wherein if an instruction about generation of a new password is given by a user's manipulation, generating a new password.

* * * * *